United States Patent [19]

Cotter

[11] Patent Number: 5,038,912
[45] Date of Patent: Aug. 13, 1991

[54] VERTICALLY ACTUATED TRANSFER SWITCH

[75] Inventor: David H. Cotter, Coopersville, Mich.

[73] Assignee: Rapistan Corporation, Grand Rapids, Mich.

[21] Appl. No.: 606,885

[22] Filed: Oct. 31, 1990

[51] Int. Cl.⁵ .............................................. B65G 47/46
[52] U.S. Cl. ...................................... 198/370; 198/372
[58] Field of Search ................. 198/370, 372, 365, 456

[56] References Cited

U.S. PATENT DOCUMENTS

| | | |
|---|---|---|
| 2,503,864 | 4/1950 | Carter . |
| 3,400,803 | 9/1968 | Lanore . |
| 3,666,050 | 5/1972 | Krammer . |
| 4,397,386 | 8/1983 | Kampf . |
| 4,498,576 | 2/1985 | Anderson . |
| 4,711,341 | 12/1987 | Yu et al. ............................ 198/372 |
| 4,717,011 | 1/1988 | Yu et al. ........................ 198/372 X |
| 4,732,259 | 3/1988 | Yu et al. ........................ 198/372 X |
| 4,738,347 | 4/1988 | Brouwer et al. ..................... 198/372 |
| 4,817,779 | 4/1989 | Beck et al. . |
| 4,884,677 | 12/1989 | Yu et al. ............................. 198/370 |

Primary Examiner—D. Glenn Dayoan
Attorney, Agent, or Firm—Price, Heneveld, Cooper, DeWitt & Litton

[57] ABSTRACT

A conveyor including an endless, driven surface for transporting articles and article diverting shoes having a depending guide pin to control their direction of travel. The shoes divert the articles from the conveyor path. The diverter shoes utilize a plate-like gate positioned at an angle to the direction of diverter shoe movement along the conveyor path. The gate is at one end of an arm which extends laterally from the path of travel of the diverter shoes and their depending pins. This gate is pivotally supported between its ends. The end of the arm opposite from the gate is secured to the armature of a solenoid which, when energized, causes the gate to be pivoted upwardly into erected, pallet diverting position with its path of movement being substantially vertical. Upon deenergization of the solenoid, a spring retracts the gate. As a result of this arrangement, the movement of the gate is limited to about one inch, is both substantially vertical and almost instantaneous.

13 Claims, 6 Drawing Sheets

VERTICALLY ACTUATED TRANSFER SWITCH

FIELD OF THE INVENTION

The invention relates to conveyors having an endless, driven surface comprised of rollers or slats for transporting articles and, more particularly, to such conveyors equipped with article diverting shoes or the like having a depending guide pin to control their direction of travel. The shoes divert articles from the conveyor path they are following to another path extending laterally of the conveyor. The invention is particularly directed to means for activating the diverting shoes which means moves vertically between operative and retracted positions.

BACKGROUND OF THE INVENTION

In warehouses, shipping terminals and many other types of facilities, complex conveyor systems are utilized to move large quantities of articles to and from storage and also to deliver them to selected accumulation points such as truck loading docks. These systems have become large and complex and, to handle the volume of articles which must be transported, it has become necessary to increase the speed with which articles are moved along the system. In recent years the demand placed on these systems has necessitated the speed with which the articles are moved by the system to be increased from one or two hundred feet per minute to five hundred feet or more per minute. This increase in operating speed creates a number of problems and greatly complicates the design requirements of diverter switches capable of effective operation under such conditions.

The time period during which the diverter must shift between active and retracted positions has to be greatly reduced. Thus, the time interval during which the diverter must shift between retracted and active positions has been reduced to a few milliseconds. Further, the diverter member must be capable of absorbing significantly higher impact loads due to the increased speed of diverter shoe and pallet movement. This is further complicated by the fact that in some cases, the loads being carried by the individual pallets also has been increased. This further complicates the problem of impact absorption. It is also important that the diverter mechanism be dependable as a means of effectively diverting only those of the pallets selected for diversion.

BRIEF SUMMARY OF THE INVENTION

The diverter of this invention utilizes a plate-like gate positioned at an angle to the direction of diverter shoe movement along the conveyor track. The gate is at one end of an arm which extends laterally from the path of travel of the diverter shoes and their depending pins. This gate is pivotally supported between its ends. The end of the arm opposite from the gate is secured to the armature of a solenoid which, when energized, causes the gate to be pivoted upwardly into erected, pallet diverting position with its path of movement being substantially vertical. Upon deenergization of the solenoid, a spring retracts the gate. As a result of this arrangement, the movement of the gate is limited to about one inch, is both substantially vertical and almost instantaneous.

DESCRIPTION OF THE PREFERRED EMBODIMENT

Figure 1:
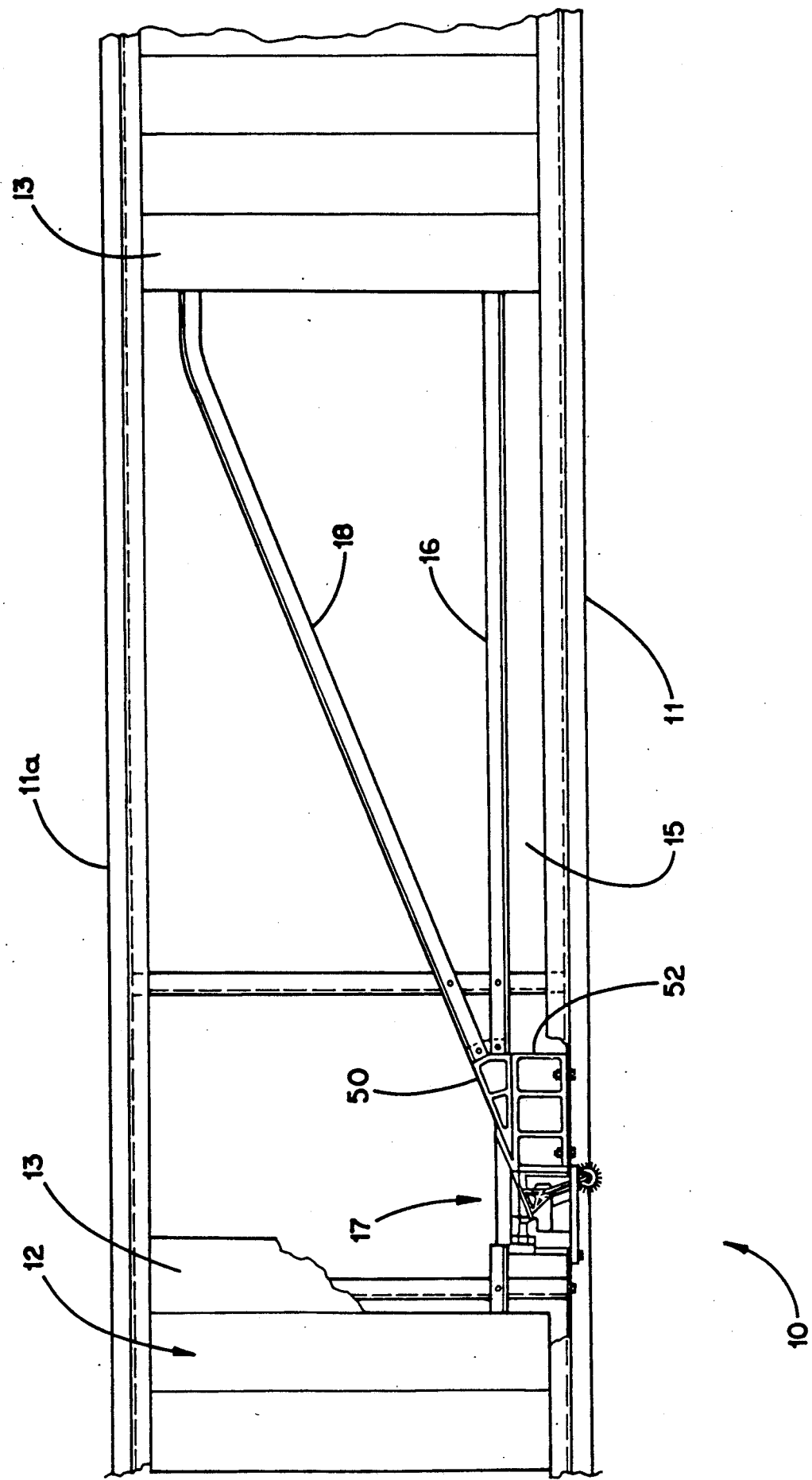
FIG. 1 is a plan view of a section of conveyor equipped with the transfer switch of this invention, with most of the conveyor slats deleted for clarity.

Referring specifically to FIG. 1, the diverter 10 is illustrated as a length of conveyor having a pair of supporting side rails 11 and 11a.

Figure 2:
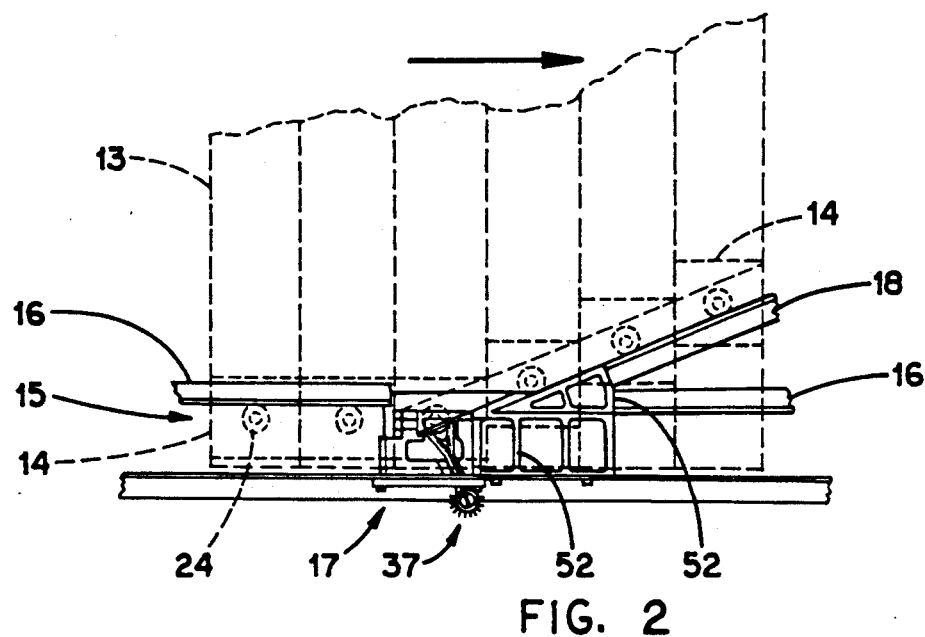
FIG. 2 is a fragmentary view of the conveyor at the switch showing some of the slats initiating movement across the conveyor.

Supported on the side rails is the article conveying surface 12 which consists of a plurality of closely spaced, laterally extending article support slats or tubes 13 which, at their ends, are connected by chains. The chains travel on appropriate tracks within the frame members 11 and 11a. The use of tubes or slats of this design is not part of this invention and their interconnection to the chains at each end which chains are supported in and by the frame members 11 and 11a is also conventional. Therefore, the details of this construction are not illustrated since they can be understood from disclosures such as that of FIG. 2 of U.S. Pat. 4,738,347, issued to Gerald A. Brouwer et al. Apr. 19, 1988. Supported on the tubes or slats 13 are diverter shoes 14 (FIG. 2). These shoes are slidable lengthwise of the slats 13. The specific construction of the shoes is not a feature of this invention.

Figure 11:
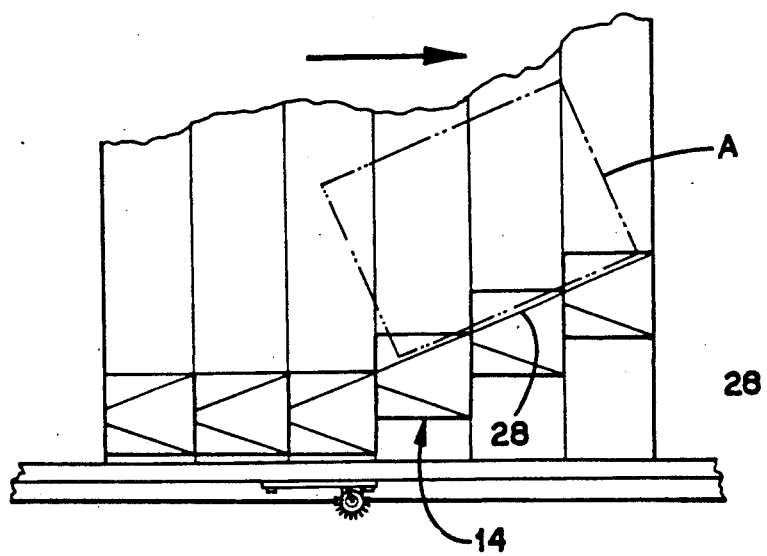
FIG. 11 is schematic of the relationship of the selected shoes to the article to be diverted.

Adjacent the side frame member 11 a shoe guideway 15 is provided, the inner edge of which is defined by a guide angle 16. The guide angle 16 maintains alignment of the shoes adjacent the side of the conveyor surface as they travel with the slats 13 lengthwise of the conveyor and restrains them from lateral movement except at those points along the conveyor where a gate 17 is provided through which the shoe can be released to travel along a transverse guide rail 18. As the slats are moved lengthwise of the conveyor, the guide rail 18 forces the diverted ones of the shoes 14 to travel diagonally across the width of the conveyor and thereby intercept an article being transported on the surface formed by the slats 13, forcing it to the side of the conveyor opposite the shoe guideway 15 (FIG. 11). The use of a gate 17 and of the transverse guide rail 18 for this purpose is conventional. However, the construction of the gate 17 which releases the shoes to the guide rail 18 is new and the subject of this invention.

Figure 12:
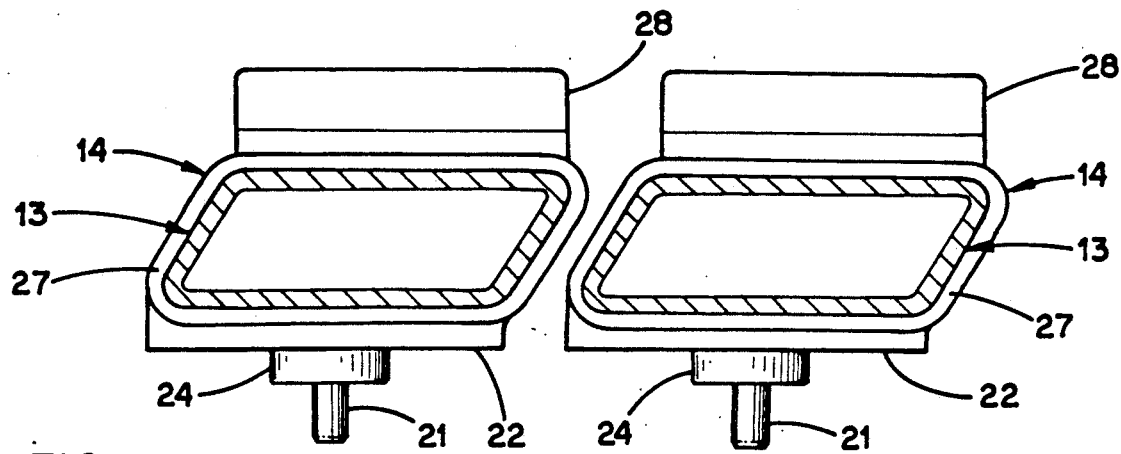
FIG. 12 is a sectional elevation view of a pair of slats with the diverter shoes mounted thereon.

While the slats 13 can be of various shapes and sizes to form the conveying surface, one particular shape that can be used is a hollow tube of substantially parallelogram configuration (FIG. 12). The slat provides a broad, flat surface for supporting both the articles and the shoes to be transported. Using a slat of this cross-sectional shape, the shoes 14, which serve as pushers for moving articles transversely of the conveying surface include a jacket portion which encircles one of the slats and is slidable lengthwise thereof to effect the transverse movement. The diverter jacket 27 has a portion 22 from the center of which depends a pin 21 on the upper portion of which is mounted a guide roller 24. The jacket has a raised article engaging portion or pusher 28 which is of a generally truncated pyramid shape to provide article contacting side walls which will seat against the article A and push it laterally across the conveyor (FIGS. 11 and 12).

When the shoes 14 are not being utilized to actually push an article off the conveyor, they travel in sequence along the shoe guideway 15 with the guide rollers 24 seated against the guide angle 16 (FIG. 2). The guide angle extends lengthwise of the conveyor adjacent one side thereof, forming the shoe guide way 15 between it and the adjacent frame member 11. The shoe guideway 15 prevents the shoes from moving transversely of the conveyor, except at that point or points along the conveyor at which a diverter gate 17 having a diverter bracket 30 is provided. The number of diverter gates 17 which are provided, will depend upon the number of locations along the conveyor at which articles are to be discharged from the conveyor. However, for purposes of disclosing the invention the description of one of the shoe diverter gates 17 will suffice, since they are all alike.

Figure 3:
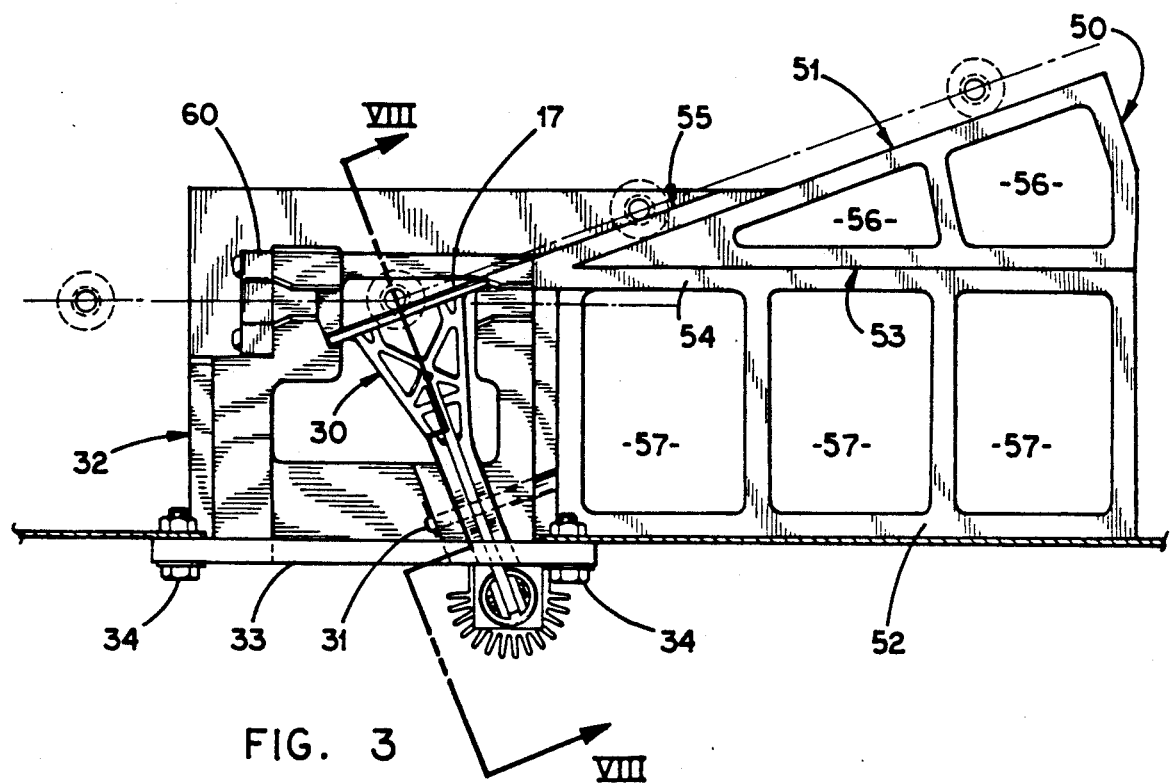
FIG. 3 is an enlarged plan view of the shoe diverter.
Figure 4:
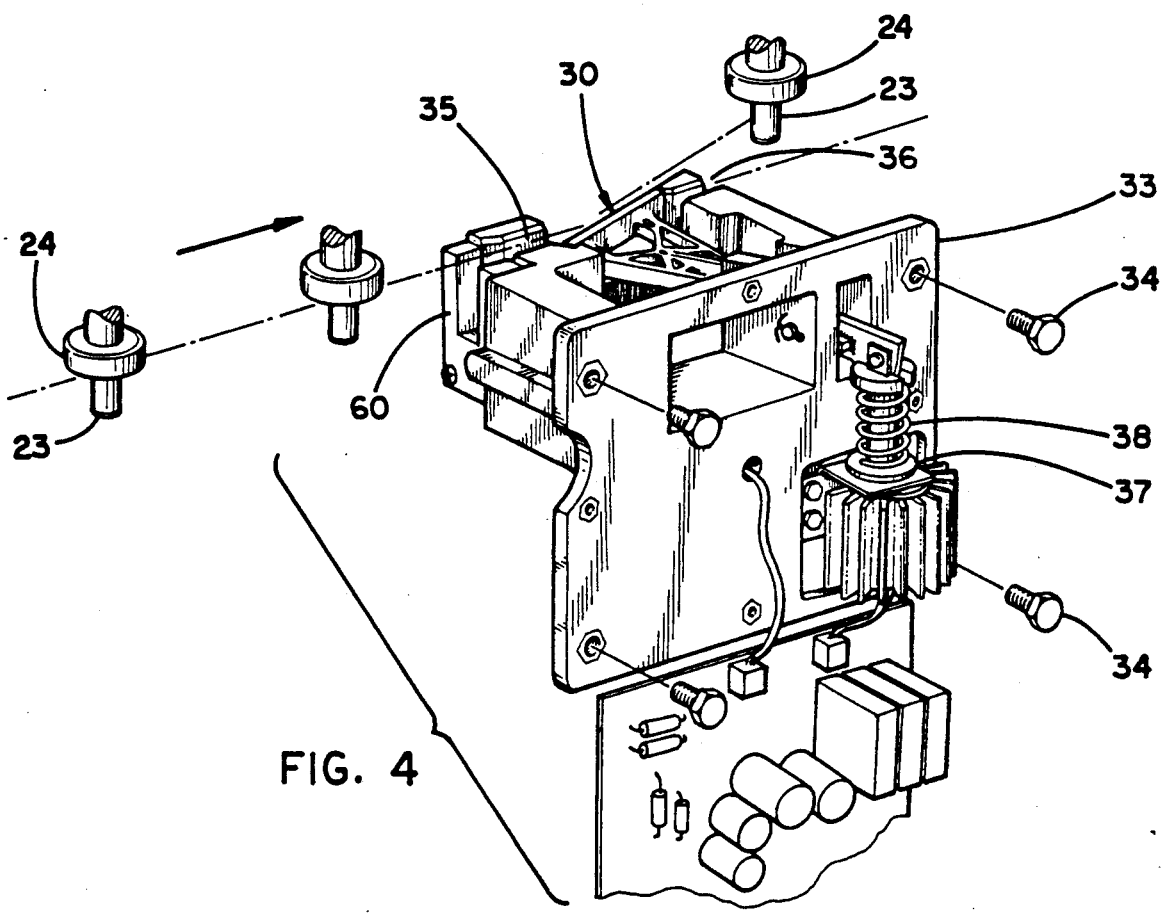
FIG. 4 is an oblique view of the shoe diverter.
Figure 5:
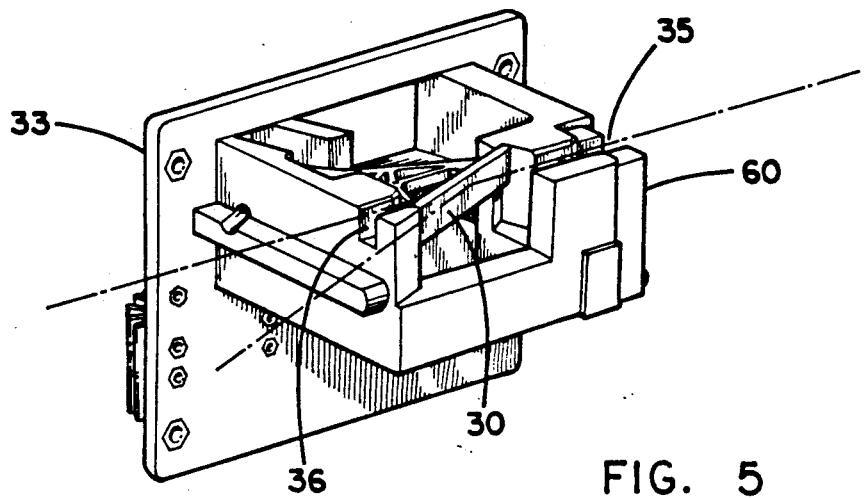
FIG. 5 is an oblique view of the end of the shoe diverter opposite from that shown in FIG. 4.
Figure 8:
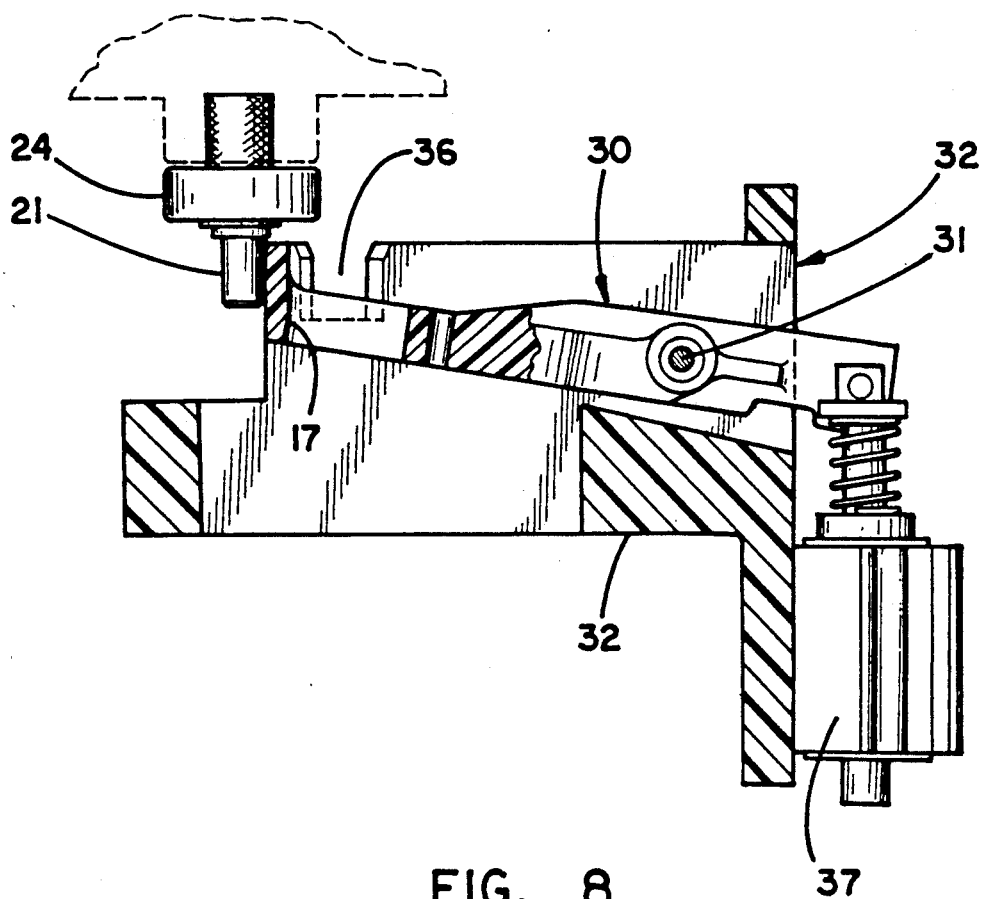
FIG. 8 is a sectional elevation view taken along the plane VIII—VIII of FIG. 3, illustrating the gate in elevated or active position.
Figure 9:
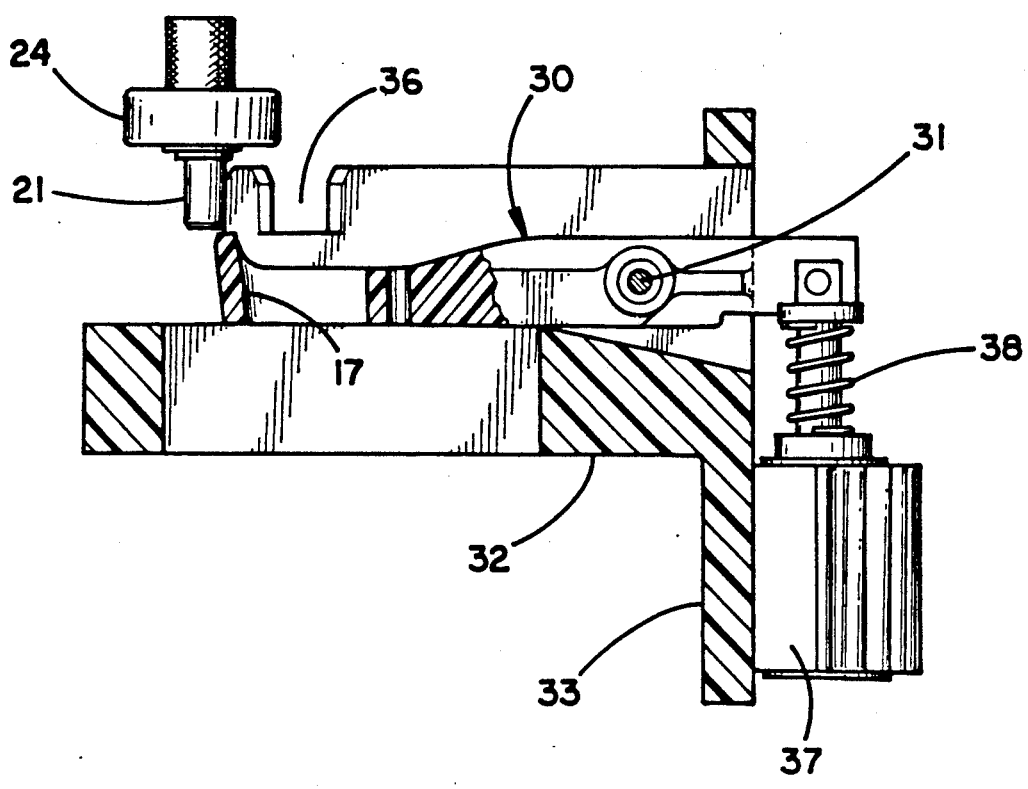
FIG. 9 is a sectional view taken along the same plane as FIG. 8, illustrating the diverter in retracted position.

Referring to FIGS. 3, 8 and 9, it will be observed that the diverter gate 17 is itself the head portion of the diverter bracket 30 which, intermediate its ends, is pivotally supported by a pin 31 securing the bracket to the diverter housing 32. The diverter housing has an outer plate 33 which mounts against the exterior face of the frame of the conveyor 10 and is supported by bolts 34 (FIGS. 3 and 4). The diverter housing extends inwardly and adjacent its inner ends has aligned openings 35 and 36 in its sides which form a passage through the housing aligned with the shoe guideway 15 for the depending pins 23 of the shoes. This passage forms part of the shoe guideway 15.

The diverter bracket 30 extends outwardly from the gate 17 and at its outer end is connected to the armature of a magnetic coil 37. When the coil is inactive, the outer end of the bracket 30 is lifted by the spring 38 which results in lowering or retraction of the gate 17 below the lower end of the pin 21 depending from a shoe 14 as it passes through the pin passage extending between the openings 25 and 26 (FIG. 9). When one or more of the shoes are to be diverted from shoe guideway 15, the coil 37 is activated, retracting the armature of the coil, raising the gate 17 into the path of the pins 21. The number of shoes thus diverted is controlled by means subsequently described herein, in accordance with the predetermined number required to divert the particular article then about to pass by the gate 17. The length of the article determines the number of shoes which must be released from the shoe guideway 15 to divert the article. As soon as the pin of the last shoe of the group being diverted has passed beyond the downstream end of the diverter bracket 30, the coil 37 is deactivated permitting the spring 38 to retract the gate 17. It will be observed from FIG. 7 that only the lower portion of the pin 21 on the shoe contacts the gate, the guide roller 24 being so located that it passes over the top of the raised diverter bracket.

It is important that the diverter bracket 30, when raised to active position be supported against lateral thrust imposed upon it by the shoes. Although the shoes 14, at the time their pins impact against the face of the diverter bracket, are not yet in contact with the article to be diverted, the mass of the individual shoes travelling at 500 or more feet per minute is, in itself, sufficient to generate substantial impact force against the diverter bracket. In addition, should the article to be diverted for any reason happen to be travelling immediately adjacent the side of the conveyor from which the shoes enter, the impact load transmitted to the bracket 30 could be much greater because of premature contact between the shoe and the article. This type of shock load must be absorbed without causing equipment failure.

Figure 7:
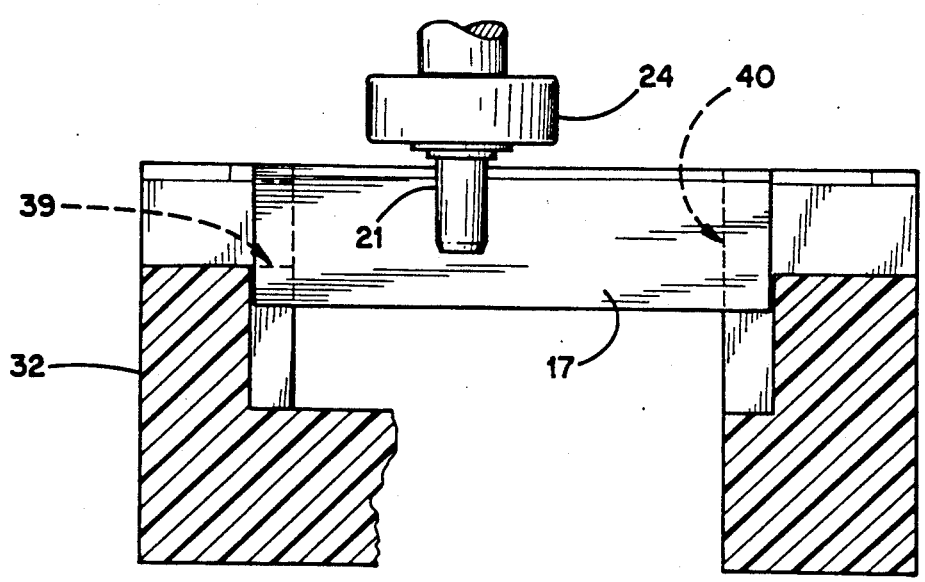
FIG. 7 is a sectional elevation view taken along the plane VII—VII of FIG. 6.
Figure 6:
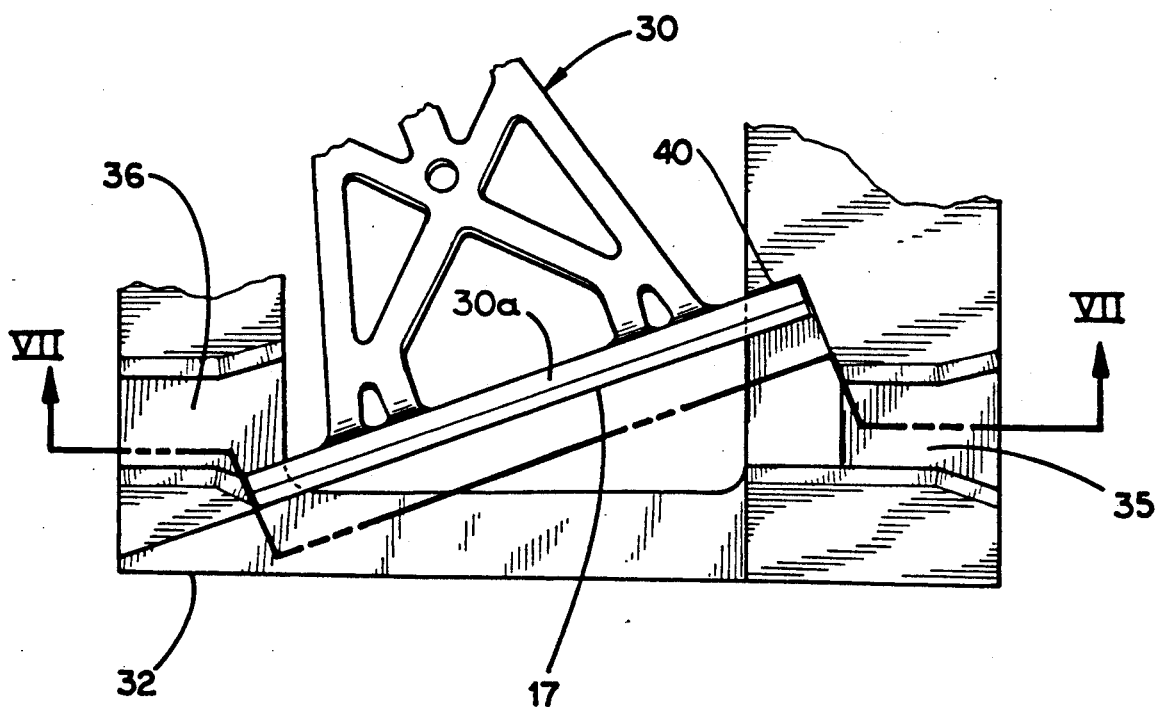
FIG. 6 is an enlarged plan view of the head of the diverter.

It is for this reason that the head of the diverter bracket 30 is supported at both ends when in the raised or active position (FIGS. 6 and 7). This is accomplished by nesting the ends of the raised diverter bracket in the recesses 39 and 40. By supporting both ends of the head 30a of the diverter bracket 30, both the head of the diverter bracket and the remaining structure of the bracket and the structure for supporting it can be less massive. This, in turn, lessens weight and inertia, reducing reaction time. Further, torsional loading of the diverter bracket and its supporting pin 31 is eliminated, thereby eliminating a major source of wear and malfunction.

It will be observed from FIGS. 8 and 9 that the total vertical movement of the head or gate 17 of the diverter actually spans only a very short distance. This distance is approximately only one inch. This is made possible by the fact that the gate moves vertically. This is important because it significantly shortens the time interval necessary to move the gate between its two positions, a significant contributing factor to the fact that the gate's reaction time can be shortened to be compatible with the increased velocity of movement of articles through the system.

Lateral guidance of the shoes upon leaving the diverter bracket 30 is taken over by the deflection member 50 (FIGS. 1 and 3). The deflection member, as illustrated, is preferably a cast or molded body, the diverter wall 51 of which extends at an angle which parallels and in effect is an extension of that of the head 30a of the diverter gate 17 and is vertically positioned to engage the guide roller 24 of the shoes. The diverter wall 51 is at the same elevation as that of transverse guide rail 18 (FIG. 1) and the shoe guideway 15, both of which are positioned to engage the guide roller 24 on the upper portion of the pin 21.

The deflection member is either integral with or a separate component rigidly connected to and supported by the block member 52. Its upper surface is sufficiently recessed that the pins 21 of shoes which are not diverted by the gate 17 can pass over it with the guide rollers in contact with the outer face 53 of the deflection member 50. Thus, the tops of the walls 54 are recessed below the ends of the diverter pins 23. The initial portion of the diverter wall 51 provides a pin contacting projection or ledge 55 for a short distance to assure lateral movement of the shoes until the shoes' guide roller 24 reaches a position at which it has positive contact with the diverter wall 51. The width of the ledge is that necessary to compensate for the difference between the radial width of the wheel as compared to that of the pin.

Not only is it necessary that the deflection member be able to withstand repeated impact as the shoes are diverted, but also that it not be made of a heavy material. Also elimination of excess noise is an important factor. To satisfy these requirements, the deflection member and the block member are molded as a single, integral component from UNIROYAL ADIPRENCE® URETHANE RUBBER-70 D DUROMETER UNIROYAL CHEMICAL DIV. OF UNIROYAL, INC. NAUGATUCK, CONN. 06770. To maintain uniformity of wall thickness, reduce weight and cost, the unit is provided with cavities 56 and 57 which extend vertically through it.

Figure 10:
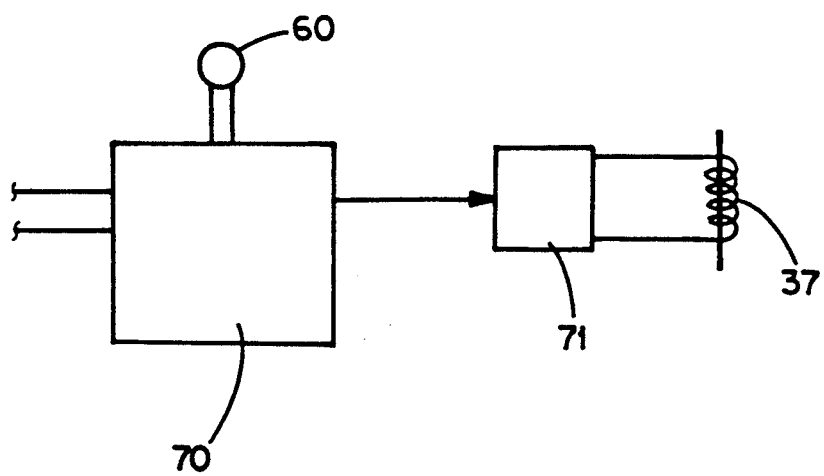
FIG. 10 is a schematic of the control means for the switch operating solenoid.

There are several ways in which the operation of the invention can be initiated and controlled. One of these is to provide a computer 70 into which the identity of the pallet or the article itself, such for example, as a case of canned soup, is entered with instructions to divert it at a certain gate. The computer 70 then processes this information and provides appropriate directions for activating the electric eye including when to erect the divert head and the number of shoes to be released from the storage channel. This information passes through the amplifier 71 to the electric eye and to the control of the solenoid 37. In doing this, the computer then, by any of several possible means, keeps track of the pallet's or article's location along the conveyor and, when the pallet or article approaches the selected gate, the photoelectric eye 60 (FIGS. 3 and 10) is activated and, at the same time, the control for the gate 17 is informed how many shoes will be necessary to cause diversion. When the pin 21 or guide roller interrupts the beam of the electric eye, this immediately activates the magnetic coil 37, pivoting the gate 17 into erected, divert position (FIG. 8). The information provided by the computer will require the gate to remain raised until the correct number of shoes scheduled for diversion have passed through the diverter.

Another method of accomplishing the same result is to provide the pallet for the item or the article itself or its package or container with a readable code, either visual or magnetic, including the diversion station's identity and the number of shoes required. This will be electronically read by means along the conveyor as the pallet or article approaches the designated station, alerting the photoelectric eye to activate the diverter when the first guide roller or pin passes through it.

The preceding are but two of the systems which could be used to provide article identity at the diverter gate to cause diversion. Both of these means of providing article identity at the gate are well-known and used in the warehouse equipment field. The invention deals with what is done with this information.

In previous systems of this type, the diverter intercepted the pallet or article by either swinging an arm horizontally into a position to intercept the pallet pin or sweep the article off the conveyor or to raise conveyor wheels or rollers, driven or otherwise, or belts which would lift the article from the conveyor's surface and direct it toward the side of the conveyor. These types of diverter gates were adequate when conveyor speeds were only about 200-250 feet per minute, since that allowed an adequate time interval between signal generation and completion of equipment response to the signal. However, when the speed of conveyor operation was doubled, these devices proved to be too slow. Further, not only has the conveyor speed doubled, but the conveyor's load density has been materially increased. This latter reduces the interval between articles. These two changes have made swinging gates and similar devices unsuitable because their reaction time is too great. The time necessary to open or close such gates, using a swinging motion, necessitates an unacceptable increase in spacing between the articles. The pivotal distance a gate must move between retracted and divert positions is too great for the new high speed conveyors.

The problem is complicated by the fact that, at these higher speeds, the gate must be supported at both ends against shoe or article impact when it is in divert position. This is not possible when the gate simply rotates horizontally into divert position. Attempts to support such a gate by retractable supports lengthens the reaction time to an unacceptable figure.

This problem has been overcome by this invention by moving the gate vertically. Using vertical movement, it is possible to positively support the gate at both ends when the gate is in operative position. Further, this support can be provided directly to the structure of the gate which acts as the diversion barrier, thereby relieving all of the remainder of the gate's structure from the necessity of impact absorption. Thus, the gate's mass can be reduced, contributing to its suitability for rapid actuation.

A further advantage of this construction is that the total distance of movement can be reduced to that of the vertical height of the diverter bracket, a distance of approximately one inch. This also reduces the time lapse necessary for completing the response to a signal requiring gate operation. The importance of this is obvious when it is considered necessary to complete gate reaction in about 20 milliseconds to avoid conflict between the gate and the advancing movement of the pins of the shoes. It is also necessary because of the shortened time interval between articles passing the diversion gate. This time restriction makes impossible the movement of any substantial mass and limits the distance the mass must be moved.

Since the diverter gate must be erected and retracted for each article which is to be diverted at that particular gate, at the high density of articles being moved by the conveyor, the frequency of gate actuation can be very high. This, in turn, can apply a heavy burden on the magnetic coil 37, generating substantial heat. To dissipate this heat, the coil can be provided with a jacket 41 having heat dissipating fins 42. This jacket can be designed to entirely surround the coil or only partially surround it, as shown in FIG. 3.

It will be recognized that the conveyor can be equipped to divert articles to either one or both sides, using transverse guide rails going in both directions which intersect at the center of the conveyor. This involves the necessity of means controlling the movement of articles and shoes through the intersection, a problem addressed in various patents including U.S. Pat. No. 3,361,247, issued January, 1968 to Lauzon et al. An improvement in the control of article and shoe movement through such an intersection is the subject of a separate application having an assignee common to both that application and this one. However, the same structural design for initiating the transfer can be used on both sides of the conveyor except for design changes made necessary by diverting from the left side of the conveyor rather than the right.

Having disclosed the preferred embodiment of the invention and some modifications thereof, it is submitted that other modifications of the invention can be made without departing from the principles thereof. Such modifications are to be considered as included in the hereinafter appended claims, unless these claims, by their language, expressly state otherwise.

I claim:

1. In a conveyor having a plurality of interconnected transverse article supports forming an article transporting surface; first means for moving said transport surface lengthwise of said conveyor; second means for moving selected ones of the articles transversely of said surface, said second means comprising:

a plurality of diverter shoes each having a depending guide pin, a guideway along one side of said conveyor for receiving said pins and guiding said shoes as they travel with and along a side of said transport surface, diverter means positioned to engage the guide pins of selected ones of said shoes to cause said shoes to leave said guideway and slide transversely of said surface, said diverter means having a pin engaging surface inclined at an angle to the longitudinal axis of the conveyor, means supporting said diverter means for vertical movement between an erected pin engaging position and a retracted position below the ends of said pins.

2. A conveyor as described in claim 1 wherein a solenoid is provided, the armature of which supports said diverter means in erected position.

3. A conveyor as described in claim 2, wherein said diverter means is integral with one end of an arm and said solenoid is secured to the other end of said arm, said supporting means further comprising means pivotally supporting said arm intermediate said ends, resilient means for pivoting said arm to diverter plate retracted position.

4. A conveyor as described in claim 3 wherein the total vertical movement of said diverter means between retracted and erected position is approximately one inch.

5. A conveyor system as described in claim 1 wherein said diverter means is supported at opposite ends in erected position.

6. In a conveyor having a plurality of interconnected transverse article supports forming an article transporting surface adapted for movement lengthwise of said conveyor; means for moving selected ones of the articles transversely of said surface, said means comprising:

a plurality of diverter shoes, a guide channel along one side of said transport surface for said diverter shoes, each shoe being independently supported on said article supports; a shoe discharge gate in said guide channel, each of said shoes having a depending guide pin and diverter means at said discharge gate positioned to engage the guide pins of selected ones of said shoes to cause said shoes to exit from said guide channel and to slide along said article supports transversely of said surface, said diverter means having a pin engaging diverter plate inclined at an angle to the central axis of said guide channel, means supporting said diverter plate for vertical movement between an erected pin engaging position and a retracted position below the end of the pins.

7. A conveyor as described in claim 6 wherein a solenoid is provided, the armature of which supports said diverter plate in erected position.

8. A conveyor as described in claim 7 wherein said diverter plate is integral with one end of an arm and said solenoid is secured to the other end of said arm, said supporting means further comprising means pivotally supporting said arm intermediate its ends, resilient means for pivoting said arm to diverter plate retracted position.

9. A conveyor as described in claim 8 wherein the total vertical movement of said diverter plate between retracted and erected position is approximately one inch.

10. A conveyor system as described in claim 8 wherein said diverter means is supported at opposite ends in erected position.

11. In a conveyor having a plurality of interconnected transverse article supports forming an article transporting surface adapted for movement lengthwise of said conveyor; means for moving selected ones of the articles transversely of said surface, said means comprising:

a plurality of diverter shoes, each mounted on and transportable with and slidable lengthwise of a separate one of said article supports, a guide channel adjacent one edge of said transporting surface and means restraining said shoes from movement other than lengthwise of said guide channel, each of said shoes having a pin and guide means extending downward therefrom below said article supports, a gate in said restraining means through which selected ones of said shoes can be released from said guide channel, said gate being supported for vertical movement between a raised position intercepting the path of movement of said pins and a retracted position below said pins; a beam and means supporting said beam between its ends for vertical rocking motion, said gate being connected at one end of said beam and a solenoid means connected to the other end in a manner such that when the solenoid is activated, the gate is pivoted into a shoe deflecting position, resilient means for retracting said gate; control means including a computer controlling circuit connected to said solenoid for holding said solenoid in gate erected position for the time interval necessary to effect discharge from said guide channel of as many of the shoes as the size of the article requires to effect its movement transversely of the conveyor.

12. A conveyor system as described in claim 11 wherein the total vertical movement of said gate between retracted and erected position is approximately one inch.

13. A conveyor system as described in claim 11 wherein said gate is supported at opposite ends in raised position.

* * * * *